United States Patent [19]

Hongu et al.

[11] Patent Number: 5,268,919
[45] Date of Patent: Dec. 7, 1993

[54] GAS LASER OSCILLATING DEVICE

[75] Inventors: Hitoshi Hongu, Kawanishi; Yutaka Iwasaki, Takarazuka, both of Japan

[73] Assignee: Matsushita Electric Industrial Co., Ltd., Kadoma, Japan

[21] Appl. No.: 846,685

[22] Filed: Mar. 4, 1992

[30] Foreign Application Priority Data

Mar. 5, 1991 [JP] Japan ................. 3-037672

[51] Int. Cl.$^5$ ............................... H01S 3/03
[52] U.S. Cl. .......................... 372/61; 372/33; 372/58
[58] Field of Search .......... 372/58, 33, 61, 59, 372/87

[56] References Cited

U.S. PATENT DOCUMENTS

| 4,672,621 | 6/1987 | Morita et al. | 372/58 |
| 4,873,693 | 10/1989 | Cook, Jr. | 372/33 |

FOREIGN PATENT DOCUMENTS

| 0073992 | 3/1983 | European Pat. Off. |
| 3536770 | 4/1987 | Fed. Rep. of Germany |

OTHER PUBLICATIONS

"Anodic-Bore Ion Laser Tube", W. H. McMahan, Applied Physics Letters. vol. 12, No. 11, Jun. 1, 1968, pp. 383-385.

"A Sealed-Off Beryllia Tube Argon Ion Laser", P. C. Conder et al., The Radio and Electronic Engineer, vol. 39, No. 2, Feb. 1970, pp. 97-103.

Primary Examiner—James W. Davie
Attorney, Agent, or Firm—Wenderoth Lind & Ponack

[57] ABSTRACT

A gas laser oscillating unit comprises: an electric discharge tube 1 for generating an electric discharge which is to be used as a laser excitation source for laser gas flowing in one direction 17 between an anode 3 and a cathode 2 which are made of a metal material and located at both ends of the electric discharge tube 1, a tube member 22 having a pair of slits 21 for generating a swirl of laser gas upstream of the cathode 2, and a tapered hollow member 23 having a tapered inner surface 23a for squeezing the laser gas stream. The cathode 2 is connected with the tube member 22 through the tapered hollow member 23. At least the inner surface of each of the tube member 22 and the tapered hollow member 23 is made of an alloy material containing aluminum and is processed to form a black alumite layer 31 thereon, wherein the black alumite layer 31 is made from an inorganic material.

2 Claims, 2 Drawing Sheets

GAS LASER OSCILLATING DEVICE

BACKGROUND OF THE INVENTION

1. Field of the Invention

The present invention relates to a gas laser oscillating device, and more particularly to an axial-flow type gas laser oscillating device in which the physical axis of the electric discharge tube coincides with the optical axis of the electric discharge tube.

2. Description of the Prior Art

A known conventional gas laser oscillating unit for obtaining a stable laser beam has a construction as shown in FIG. 1.

Referring to FIG. 1, the gas laser oscillating unit is provided with an electric discharge tube B for generating an electric discharge which is used as a laser excitation source for laser gas flowing in a direction shown by an arrow A between metal electrodes of anode and cathode. The cathode C of the metal electrodes is connected to a tube member E by way of a tapered hollow member F having a tapered inner surface f. The tube member E has a slit D enclosed therein for generating a swirl of laser gas upstream of the cathode C. At least the inner surface of each of the tube member E and the tapered hollow member F is made of an alloy material containing aluminum which is processed to form a black anodized aluminum (referred to as "alumite" hereinafter) layer G thereon by processing with an organic dye.

In the above type gas laser oscillating unit, there can be obtained a high-speed gas stream of approximately 100 meters per second in an electric discharge section H inside the electric discharge tube B, where diffused laser beams are efficiently absorbed by the above-mentioned black alumite layer G, resulting in obtaining a stable laser beam and consequently achieving a high-precision of a laser beam machining or the like process.

However, the above conventional construction has a problem that the cathode C and a total reflection mirror I are soiled which results in reducing the laser output as indicated by a broken line in FIG. 4 (to be described later).

According to research made by the inventors of the present invention, when the above-mentioned black alumite layer G continues to absorb diffused laser beams for a long time, the organic substance contained in the organic dye of the black alumite layer G vaporizes into the laser gas to soil the cathode C and the mirror I.

SUMMARY OF THE INVENTION

Accordingly, it is an object of the present invention to provide a gas laser oscillating unit which provides a solution to the aforesaid problem by improving the diffused laser beam absorbing capability of the alumite layer which is formed on the inner surface of the tube member including a slit as well as on the inner surface of the tapered hollow member.

In order to solve the above-mentioned problems, the present invention provides a gas laser oscillating unit comprising: an electric discharge tube for generating an electric discharge which is to be used as a laser excitation source for laser gas flowing in one direction between electrodes of an anode and a cathode which are made of a metal material and located at both sides of the electric discharge tube, a tube member having a slit for generating a swirl of laser gas in the upper stream of the cathode, and a tapered hollow member having a tapered inner surface which is located between the tube member and the cathode. The cathode is connected with the tube member through the tapered hollow member, wherein at least the inner surface of each of the tube member and the tapered hollow member is made of an alloy material containing aluminum which is processed to form a black alumite layer thereon by processing with an inorganic substance.

According to a feature of the present invention, the configurations and materials of the tube member having the slit for generating a swirl of laser gas in the upper stream of the cathode and the tapered hollow member connecting the tube member with the cathode remain conventional, while the formation of a black alumite layer on the inner surface of each of the tube member and the tapered hollow member also remains conventional. Therefore, the sufficient laser gas speed in the electric discharge tube and the sufficient diffused laser beam absorbing capability of the black alumite layer are not impaired. Furthermore, by selecting an inorganic substance for forming the black alumite layer, the conventional problem of organic substance vaporization due to absorption of diffused laser beams can be eliminated thereby to prevent the electrodes and the mirror from being soiled or damaged.

BRIEF DESCRIPTION OF THE DRAWINGS

These and other objects and features of the present invention will become apparent from the following description taken in conjunction with the drawings, in which.

DETAILED DESCRIPTION OF THE PREFERRED EMBODIMENT

The following describes in detail an embodiment of the present invention with reference to the attached drawings.

Figure 1:
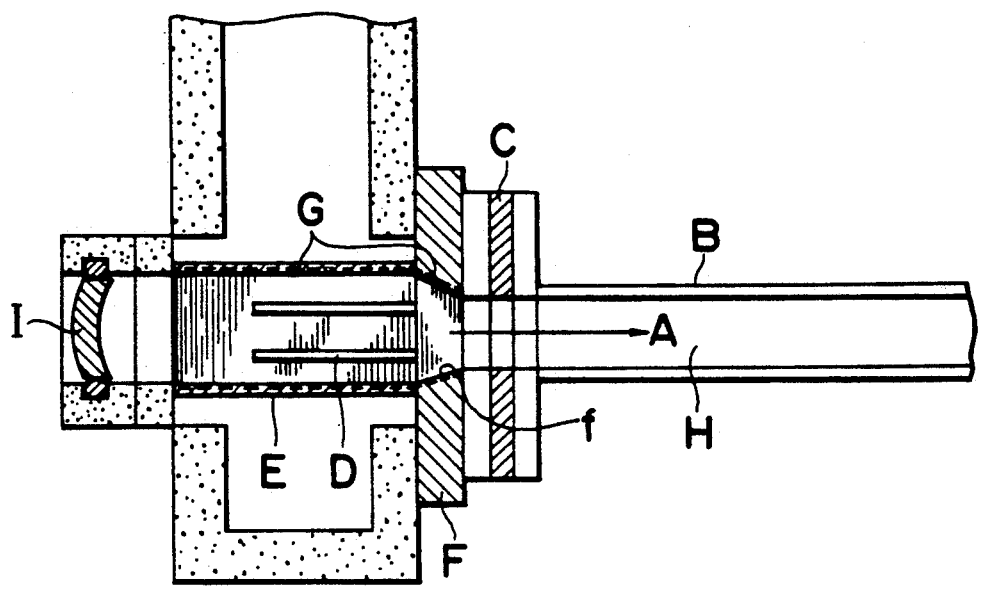
FIG. 1 is a partially enlarged sectional view of a conventional gas laser beam oscillating unit.
Figure 2:
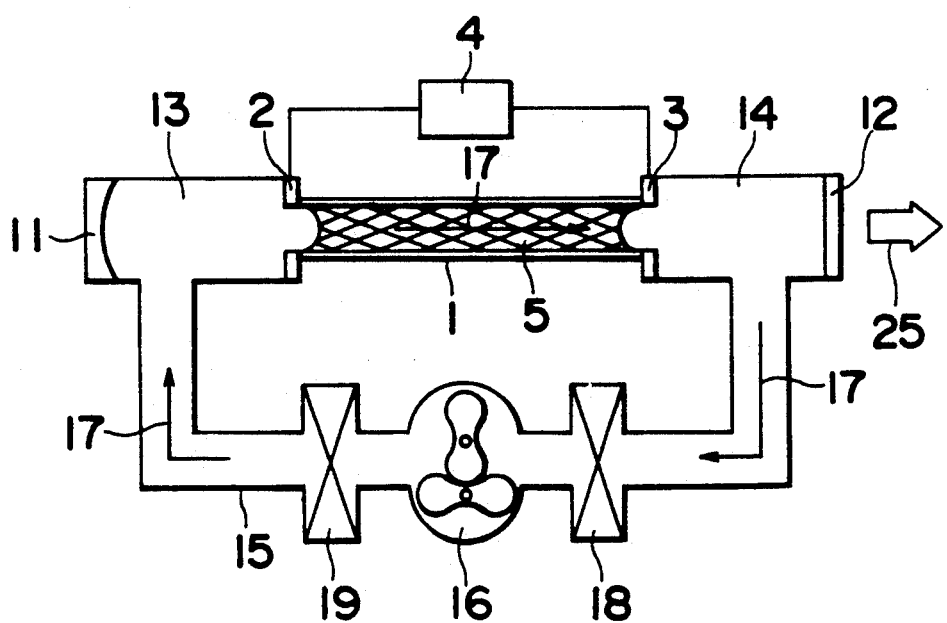
FIG. 2 is a schematic view of a gas laser oscillating unit in accordance with an embodiment of the present invention.

FIG. 2 shows a schematic view of an embodiment of a gas laser oscillating unit in accordance with the present invention with its construction having no difference from the conventional one. Referring to FIG. 2, an electric discharge tube 1 made of dielectric material such as glass is provided with metal electrodes 2 and 3 at both ends thereof. Between the electrodes 2 and 3, there is connected a high-voltage power source 4 for applying a voltage of e.g. 30 kV across the electrodes 2 and 3. In the above construction, the metal electrode 2 serves as a cathode while the metal electrode 3 serves as an anode, whereby the section therebetween in the electric discharge tube 1 is defined as an electric discharge space 5 by virtue of the high-voltage application performed by the high-voltage power source 4.

Outside the cathode 2 of the electric discharge space 5, there is provided a total-reflection mirror 11 opposite to the cathode 2 across a laser gas inlet chamber 13 coaxial with the electric discharge tube 1, while outside the anode 3 of the electric discharge space 5, there is provided a partial-reflection mirror 12 opposite to the anode 3 across a laser gas outlet chamber 14 coaxial with the electric discharge tube 1, whereby the optical axis of the total-reflection mirror 11 coincides with that of the partial-reflection mirror 12 thereby to form an axial-flow type gas laser oscillating unit.

The laser gas inlet chamber 13 is connected to one end of a laser gas circulating path 15, while the laser gas outlet chamber 14 is connected to the other end of the path 15. In the intermediate portion of the laser gas circulating path 15, there is provided a fan 16 to circulate the laser gas in the direction as indicated by an arrow 17 so as to continuously circulate the laser gas from the laser gas inlet chamber 13 to the laser gas outlet chamber 14 through the electric discharge tube 1.

Before and behind the fan 16 in the laser gas circulating path 15 with respect to the laser gas stream, there are provided cooler units 18 and 19 to, reduce the elevated temperature of laser gas caused by electric discharge in the electric discharge space 5 and circulated by the fan 16.

Figure 3:
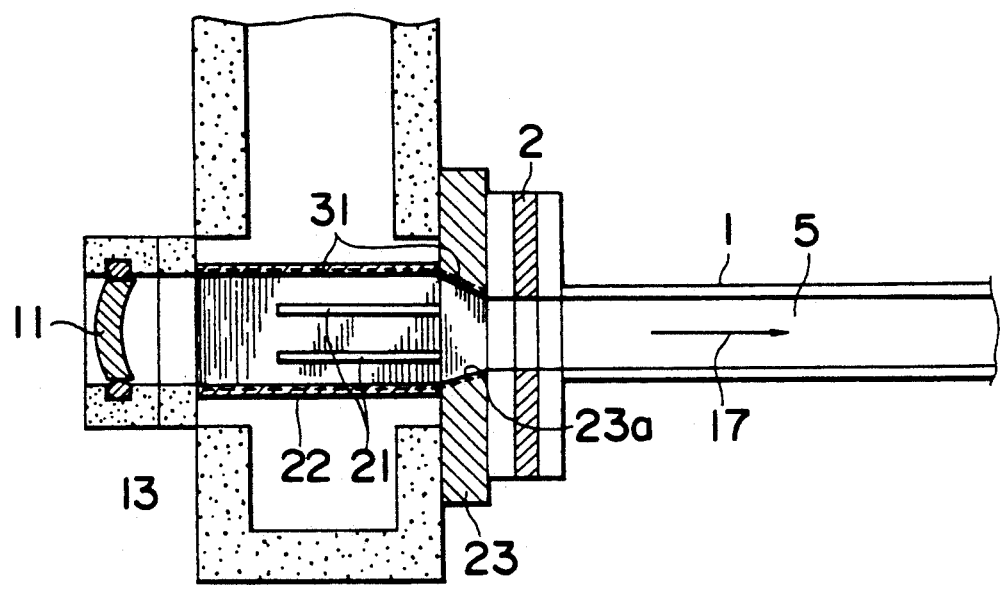
FIG. 3 is a partially enlarged section view of a gas laser oscillating unit in accordance with the embodiment of the present invention.

Referring to FIG. 3, the laser gas inlet chamber 13 is provided with a tube member 22 having a pair of slits 21 for generating a swirl stream of the laser gas supplied from the laser gas circulating path 15 into the tube member 22 located in the upper stream of the cathode 2 thereby to discharge the swirl stream of the laser gas into the electric discharge space 5 inside the electric discharge tube 1. The tube member 22 is connected to the cathode 2 by way of a tapered hollow member 23 with its inner surface 23a tapered. The entire body or at least the inner surface portion of each of the tube member 22 and the tapered hollow member 23 is made of an aluminum group material which is subjected to a black alumite process to form a black alumite layer 31 thereon. In this example, as the slit 21, there may be used a single slit.

With the above construction, by applying a high voltage from the high-voltage source 4 across the metal electrodes 2 and 3, a glow-like electric discharge is generated in the electric discharge space 5. In the above electric discharge condition, the laser gas passing through the electric discharge space 5 circulated by the, fan 16 is excited by absorbing the above-mentioned glow-like electric discharge energy. The excited laser gas is put in a resonance condition by means of an optical resonator consisting of the total-reflection mirror 11 and the partial-reflection mirror 12 to thereby emit a laser beam 25 through the non-reflective portion of the partial-reflection mirror 12 as shown in FIG. 2.

In the above-described processes, the laser gas is formed into a swirl stream upstream of the cathode 2 before the laser gas is fed into the electric discharge space 5. The swirl stream of the laser gas is squeezed through the tapered hole defined by the tapered inner surface 23a of the tapered hollow member 23 thereby to assure a stabilized high-speed gas stream having a speed of approximately 100 meters per second in the electric discharge space 5. Moreover, the black alumite layer 31 effectively absorbs the diffused laser beams, for example, an infrared ray having a wavelength of 9 to 11 microns of a $CO_2$ laser beam, thereby assuring a stabilized laser beam 25 suitable for a process using a laser beam.

Particularly in the present embodiment, each of the tube member 22 and the tapered hollow member 23 is made of an alloy material containing aluminum, while the alumite layer 31 is in the form of an inorganic black alumite layer mainly containing nickel.

Figure 4:
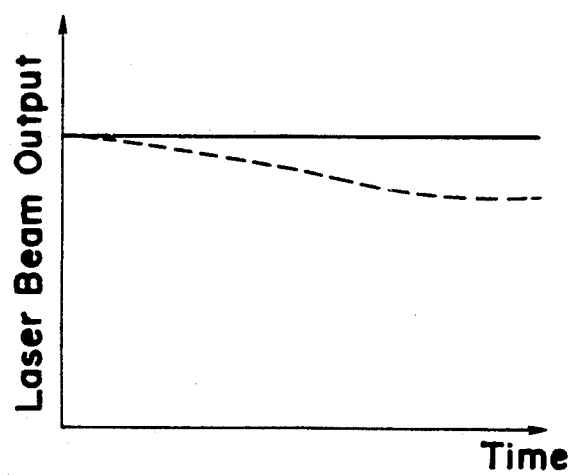
FIG. 4 is a graph for a comparison on a time base between the change of the laser output in accordance with the embodiment of the present invention and the laser output of a conventional unit shown in FIG. 1.

According to an experiment carried out by the inventors of the present invention, vaporization of organic substance which is fatal in the conventional gas laser oscillating unit is not observed in the above embodiment even when the black alumite layer 31 continues to absorb diffused laser beams for a long time. Therefore, it becomes possible to eliminate the problem involved in the conventional gas laser device that the electrodes 2 and 3 and the mirrors 11 and 12 are soiled which reduces the laser output. Thus, the laser output is stabilized as indicated by the solid line in FIG. 4, resulting in a remarkable improvement of the stability of the laser output over time as compared with the conventional laser output performance as indicated by the broken line in FIG. 4.

Furthermore, heat generated due to absorption of infrared rays in the alumite layer 31 is absorbed by the aluminum material having an excellent heat conductivity and is cooled by the high-speed laser gas stream, thereby suppressing the heat distortion of the unit material attributable to heat.

It is noted that a black alumite layer containing any other inorganic substance than nickel can produce the same effect so far as the black alumite layer is made from an inorganic substance.

According to the construction of the present invention, the configurations and materials of the tube member having the slits for generating a swirl of laser gas upstream of the cathode and of the tapered hollow member connecting the tube member with the cathode remain conventional, while the formation of a black alumite layer on the inner surface of each of the tube member and the tapered hollow member also remains conventional. Therefore, the sufficient flowing speed of the laser gas in the electric discharge tube and the sufficient diffused laser beam absorbing capability of the black alumite layer are not impaired.

Furthermore, by selecting an inorganic substance for the black alumite layer, the conventional problem of organic substance vaporization due to absorption of diffused laser beams can be eliminated to prevent the electrodes and the mirror from being soiled or damaged. The above construction assures a stable laser beam generation for a long time to improve the processing accuracy in a process of laser beam machining or the like process.

Although the present invention has been fully described by way of an example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A gas laser oscillating device comprising:
   an electric discharge tube for generating an electric discharge which is to be used as a laser excitation source for a laser gas flowing in one direction from one metal electrode serving as a cathode to an other metal electrode serving as an anode, said cathode and anode being located at respective opposite ends of said electric discharge tube;
   a tube member having a slit therein for generating a swirl stream of the laser gas upstream of said cathode, and a tapered hollow member having a tapered inner surface defining a squeezing hole for squeezing the laser gas stream supplied through said tube member into said electric discharge tube, said tapered hollow member being interposed between said tube member and said cathode thereby to connect said cathode with said tube member by way of said tapered hollow member, wherein at least the inner surface portion of each of said tube member and said tapered hollow member is made of an alloy material containing aluminum, which is processed to form thereon a black alumite layer made from an inorganic material for absorbing diffused laser beams.

2. The gas laser oscillating device as claimed in claim 1, wherein said black alumite layer is made from an inorganic substance mainly containing nickel having a capability of absorbing a diffused laser beam.

* * * * *